United States Patent
Tekawy et al.

(10) Patent No.: US 7,256,734 B2
(45) Date of Patent: Aug. 14, 2007

(54) SPOT BEAM ANTENNA BORESIGHT CALIBRATION USING GPS RECEIVERS

(75) Inventors: Jonathan A. Tekawy, Newport Coast, CA (US); Kevin M. O'Brien, Los Alamitos, CA (US)

(73) Assignee: The Boeing Company, Chicago, IL (US)

( * ) Notice: Subject to any disclaimer, the term of this patent is extended or adjusted under 35 U.S.C. 154(b) by 18 days.

(21) Appl. No.: 11/214,357

(22) Filed: Aug. 29, 2005

(65) Prior Publication Data

US 2007/0046537 A1    Mar. 1, 2007

(51) Int. Cl.
*H04B 7/185* (2006.01)
(52) U.S. Cl. ..................... 342/358; 342/174
(58) Field of Classification Search ................ 342/96, 342/173, 174, 358, 359; 343/754, 757
See application file for complete search history.

(56) References Cited

U.S. PATENT DOCUMENTS

| 4,837,576 A | * | 6/1989 | Schwarz ...................... 342/77 |
| 5,043,737 A | * | 8/1991 | Dell-Imagine .............. 342/358 |
| 6,853,330 B1 | * | 2/2005 | Krikorian et al. ........... 342/149 |
| 2005/0048915 A1 | * | 3/2005 | Westall ...................... 455/13.3 |

OTHER PUBLICATIONS

Ohtakay, H. et al., "Inflight Calibration Technique for Onboard High-Gain Antenna Pointing," J. Spacecraft vol. 12, No. 12., Dec. 1975, pp. 754-759.

* cited by examiner

*Primary Examiner*—Dao L. Phan
(74) *Attorney, Agent, or Firm*—Gates & Cooper LLP

(57) ABSTRACT

A method and apparatus for calibrating such a spot beam antenna by use of scanned spot beam signal characteristics measured by a plurality of ground based navigation receivers is disclosed.

20 Claims, 5 Drawing Sheets

SPOT BEAM ANTENNA BORESIGHT CALIBRATION USING GPS RECEIVERS

BACKGROUND OF THE INVENTION

1. Field of the Invention

The present invention relates to systems and methods for calibrating the pointing of antennas used in satellite-based navigation, and in particular, to a method and apparatus for calibrating such antennas by use of scanned spot beam signal characteristics measured by a plurality of navigation receivers.

2. Description of the Related Art

The Global Positioning System (GPS) is a satellite system that transmits navigation signals that are received by navigation receivers and used to determine the position of the receiver to a high degree of accuracy. Currently, GPS provides standard service to commercial receivers, and a higher accuracy signal to military receivers designed to receive them.

Since such signals have military applications, countermeasures can be expected to be applied to reduce their effectiveness. One such countermeasure is jamming. To increase the effectiveness of the GPS signals in a jamming environment, a high gain spot beam antenna may be used to beam high intensity spot beams of GPS signals to areas where such jamming is expected to occur. However, the high gain of such antennas is obtained at the cost of reduced beamwidth.

Improperly pointing a spot beam antenna can result in many significant and very costly problems. The pointing problem means that GPS users (e.g., GPS-based weapon systems) in the targeted area of operation may not receive the spot beam GPS signal (rendering the weapon useless), and other equipment in the neighboring region may be unintentionally disrupted by this high-gain signal. This problem will also result in greater collateral damage and an increased number of sorties and weapons. Accurate antenna pointing needs to be maintained within a tight bound to support the Area of Operations and to minimize radio frequency interference in the neighboring region.

Hence, for such a system to be effective, the spot beams must be accurately directed at the area of operation (AOO) of interest. To achieve this, the space vehicle attitude sensors and antenna signal boresight must be accurately calibrated.

Techniques for calibrating the antenna signal boresight can be categorized as either ground calibration or on-orbit calibration. In ground calibration, the antenna signal boresight and other satellite systems ate physically calibrated on the ground during pre-flight tests. While effective, the ground calibration approach renders inaccurate solutions due to launch vehicle vibration and other effects in between the calibration on the ground and the final activation of the satellite in space.

The second category of calibration is on-orbit calibration. This technique has been applied to geosynchronous and other types of satellites, and uses ground stations and fixed-location ground beacons which are dedicated for that purpose. Such a system for interplanetary spacecraft is disclosed in "*In-flight Calibration Technique for Onboard High-Gain Antenna Pointing*", Hiroshi Ohtakay and Jerome Hardman, AIAA Journal of Spacecraft, Vol. 12 No. 12, page 754-759, which is hereby incorporated by reference herein. Unfortunately, this technique requires large fixed ground antennas which have limited availability due to resource sharing among different satellite constellations. Such resource sharing isn't a difficult problem for geosynchronously based constellations, but typical navigation satellites such as GPS satellites are not geosynchronous, and do not maintain a fixed position over a point on the Earth, but are constantly moving relative to the surface of the Earth. They thus may require additional ground stations, more frequent calibration, further burdening the ground resources.

The ground antennas are also dedicated to the purpose of calibration, and are costly. In addition, due to a limited number of fixed ground antenna locations, the geometry of the satellite and ground system often limits the effectiveness of such on-orbit systems. Such problems are worse for non-geosynchronous satellites, as they are moving with respect to the Earth's surface.

What is needed is a method for inexpensively and quickly calibrating the antenna boresights without the need for expensive ground stations dedicated to that purpose. The present invention satisfies this need.

SUMMARY OF THE INVENTION

To address the requirements described above, the present invention discloses a method and apparatus for calibrating a signal boresight of a navigation satellite antenna. The apparatus comprises a command module, for commanding the satellite antenna to transmit a signal toward a plurality of navigation receivers using a known amplitude profile and scan profile; a reporting module, disposed in each of the navigation receivers, for reporting data describing the received navigation signal; and a boresight calibration module, for determining the boresight of the navigation satellite antenna from the data describing the received signal from each of the ground stations and the known amplitude profile and scan profile. The method comprises the steps of scanning the navigation satellite antenna to transmit a signal to a plurality of navigation receivers using a known amplitude profile and scan profile, receiving data describing the received signal from each of the navigation receivers, and determining the boresight of the antenna from the data describing the received navigation signal from each of the ground stations and the known amplitude profile and scan profile.

In one embodiment, the satellite is a GPS satellite that has a GPS spot beam antenna that transmits L-Band frequency signals. The antenna has two gimbaled motors for pointing the antenna at desired locations on the Earth's surface. Since the satellite attitude can be determined from spacecraft attitude sensors, the GPS satellite gimbal motors slew the spot beam antenna to scan across one or more GPS receivers in a known pattern (e.g., cross-shaped scan). The GPS receivers on Earth track and record the received power level, or other metric such as the carrier to noise ratio (CNR) on the GPS L-band channel during this scan. Using this information, the signal peak can be computed. The difference between where this peak is measured and where it was expected to be provides an estimate of the antenna pointing errors.

This process can be repeated many times and performed using a plurality of GPS receivers, and multiple measurements can be collected over several orbits. The use of multiple measurements reduces noise effects and maximizes alignment error observability (i.e. provides a wide range of geometries to calibrate over).

Using these multiple pointing error measurements, ground software (i.e., Kalman Filter or least squares algorithm) estimates the spot beam antenna alignment errors. Then the GPS ground station uploads alignment corrections to the GPS satellite.

GPS receivers are inexpensive, usually portable, and readily available as compared to a large fixed ground antenna. If mobile GPS receivers are used, this approach also improves satellite observability by allowing calibration over many geographical areas, requires fewer measurements and hence produces faster convergence and a more accurate alignment estimate as compared to using fixed ground antennas.

By directly solving the technical problem of minimizing alignment errors between satellite attitude sensor(s) and the antenna signal boresight, this invention also solves a host of other problems. It (1) improves mission effectiveness in a GPS jamming environment: increasing kill probability, reducing number of sorties and weapons and minimizing collateral damage, (2) minimizes unintentional RF interference to other systems, (3) enables antenna boresight angular calibration using one or more GPS receivers, (4) eliminates the need to perform on-orbit calibration using a large fixed ground antenna and improves scheduling availability, (5) enables satellite observation from anywhere and anytime on Earth using a mobile GPS receiver.

Advantageously, the GPS receiver and calibration (power measurement) receiver can be a single integrated item, so that location information at the ground station is inherently known by the system at all times. This avoids the problem of determining the ground station location for each new ground station. The system also uses a combination of proven existing advanced technologies (GPS receivers) and methodologies (Kalman Filters and least squares estimation) to allow fully automatic operation with high accuracy. The system also allows the ground stations used for calibration to be rapidly relocated, and can even be set up aboard ocean-going vessels.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
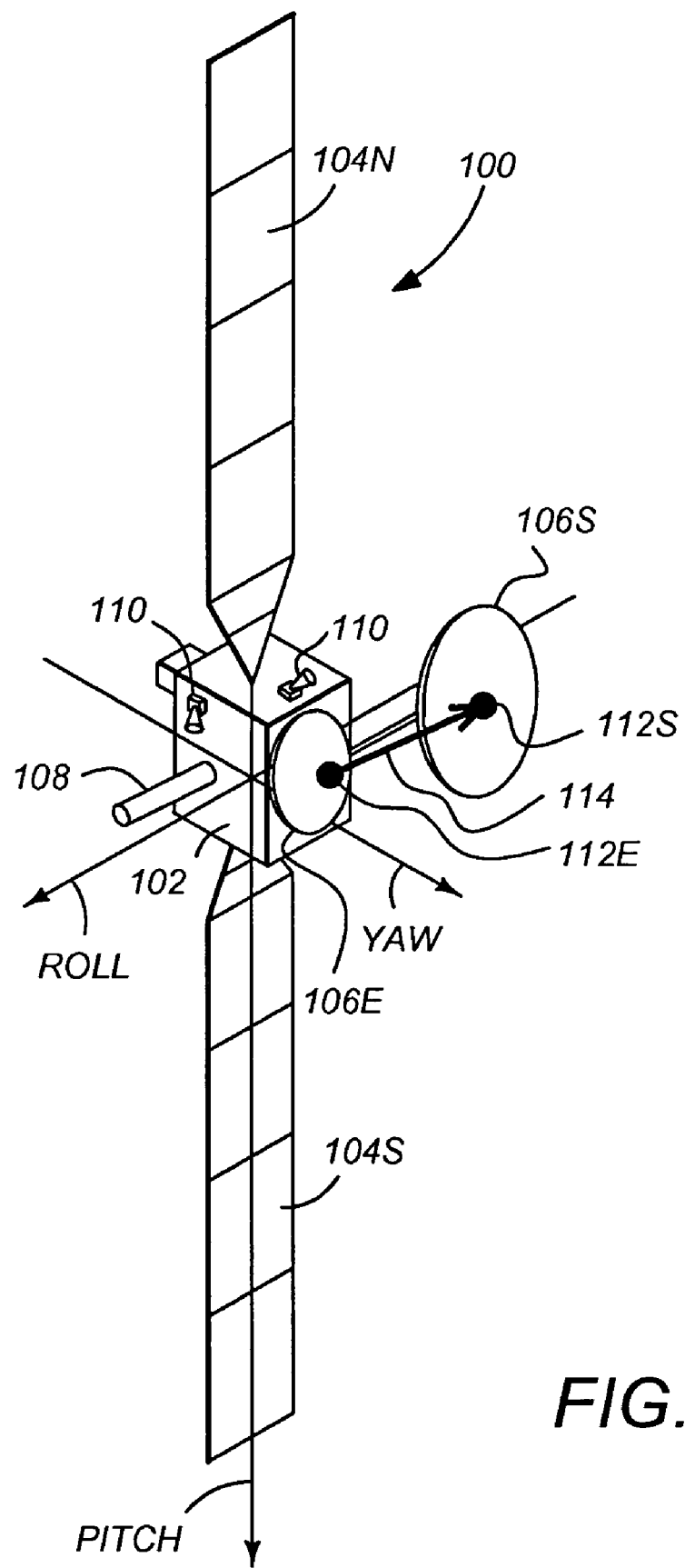
FIG. 1 is an illustration of a three-axis stabilized satellite.

FIG. 1 illustrates a three-axis stabilized satellite or spacecraft 100. The satellite 100 has a main body 102 (which may be referred to as the "satellite bus"), one or more solar panels 104, one or more navigation beam antennas 106E and 106S, and a telemetry and command antenna 108 which is used to communicate with a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 100 are shown in FIG. 1. The pitch axis lies along the line of the solar panels' 140N and 140S mutual rotation axes. The roll and yaw axes are perpendicular to the pitch axis and lie in the directions and planes shown.

In the illustrated embodiment, the satellite 100 includes a first navigation beam antenna 106E and a second navigation beam antenna 106S. The first navigation beam antenna 106E is a wide-beam antenna which transmits a navigation signal with a beamwidth covering the widest range of the Earth's surface possible from that satellite's altitude at any time, and is directed toward the Earth along the yaw axis. Since this antenna 106E offers the widest coverage of the Earth's surface, it is typically not gimbaled. Then the full constellation of satellites provide coverage any where on the Earth's surface by at least 4 different satellites at all times. The second navigation beam antenna 106S is a spot beam antenna that provides a much narrower navigation beam. This allows transmission of a higher-strength beam to selected points on the ground without requiring excessive transmitter power. This can reduce the effectiveness of countermeasures such as jamming. Since the required service area includes substantially the entire surface of the Earth, and the beamwidth of the spot beam antenna 106S is not wide enough to cover the entire surface area, the boresight of the spot beam antenna 106S can be slewed about to direct the spot beam where desired. Such slewing can be accomplished mechanically, by use of a gimbal structure driven by gimbal motors, or electronically, using phased arrays, for example.

FIG. 1 also shows the phase center 112E of the wide beam antenna 106E and the phase center 112S of the spot beam antenna 106S. Since the spot beam antenna 106S is larger and offset from the wide beam antenna 106E, the phase centers 112S 112E of the antennas are separated by an antenna lever arm 114, which is represented as a vector originating at the phase center 112E of the wide beam antenna 106E and extending to the phase center 112S of the spot beam antenna 106S. Due to motion of the satellite bus 102 and the spot beam antenna 106S and other factors, the antenna lever arm 114 does not remain fixed, but can vary substantially over time. This variance is enough to add a significant uncertainty in the ability of a navigation receiver (such as a GPS receiver) to determine it's location when a navigation signal is received via the spot beam.

Figure 2:
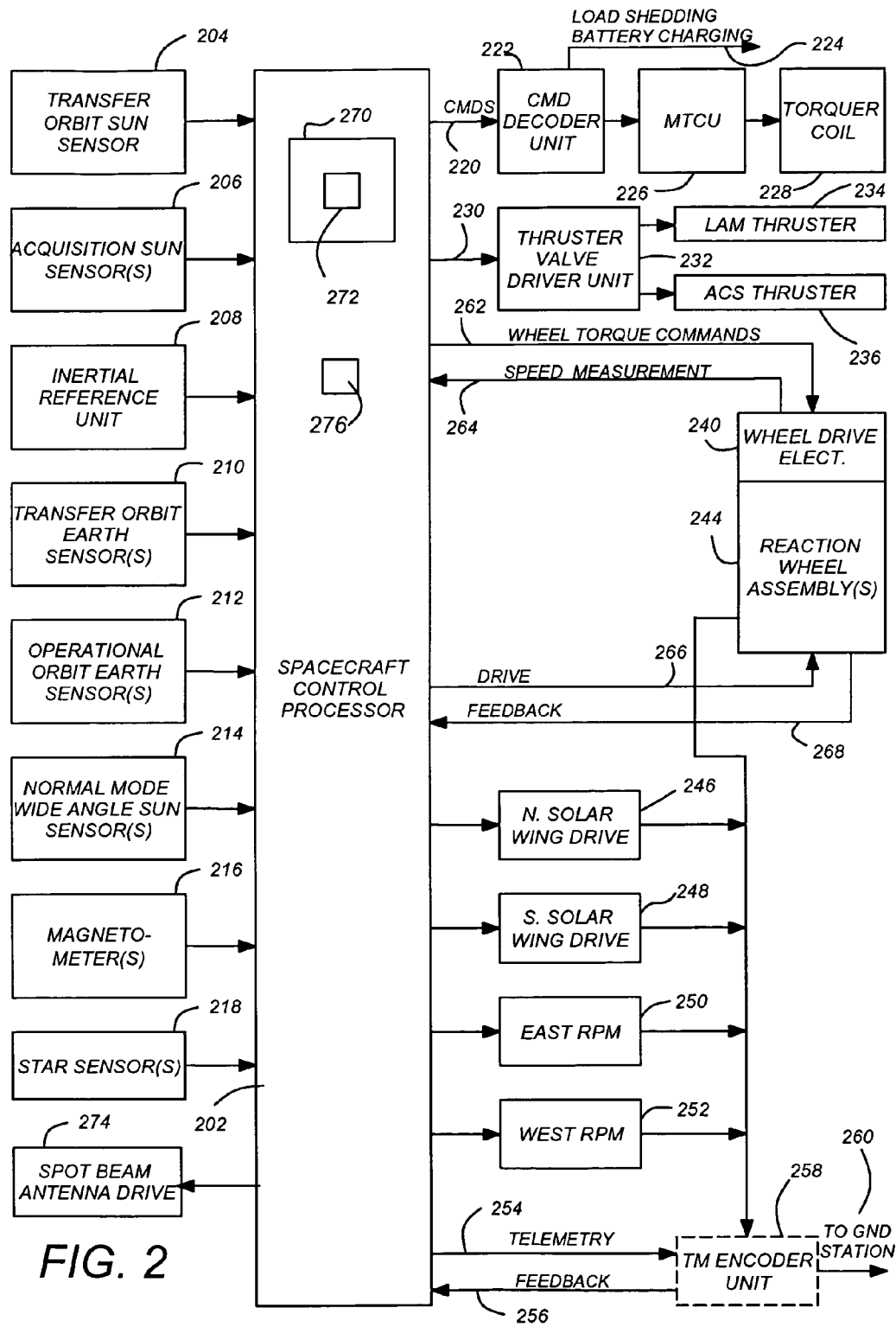
FIG. 2 is a functional block diagram depicting selected satellite subsystems.

FIG. 2 is a diagram depicting the functional architecture of a representative attitude control system. Control of the spacecraft is provided by a computer or spacecraft control processor (SCP) 202. The SCP 202 performs a number of functions which may include post ejection sequencing, transfer orbit processing, acquisition control, station-keeping control, normal mode control, mechanisms control, fault protection, and spacecraft systems support, among others.

The SCP 202 may implement one or more processing modules such as antenna control module 276, which is used to control the satellite spot beam antenna drive 274 to slew the spot beam antenna 106S to the appropriate orientation and to transmit a navigation signal. Alternatively, the antenna control module 276 can be implemented in a different processor or in dedicated circuitry.

Input to the spacecraft control processor 202 may come from a any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

Wheel torque commands 262 are generated by the SCP 202 and are communicated to the wheel drive electronics 240 which command the speed of the reaction wheels in reaction wheel assembly(s) 244. Typically, the spacecraft 100 includes four reaction wheels, at least one in each orthogonal direction, and one for redundancy purposes. The speed of the reaction wheels is also measured and fed back to the SCP 202 by feedback control signal 264.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The foregoing describes an exemplary space stabilized satellite attitude control system. The present invention can be implemented with other attitude control system designs as well.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3A:
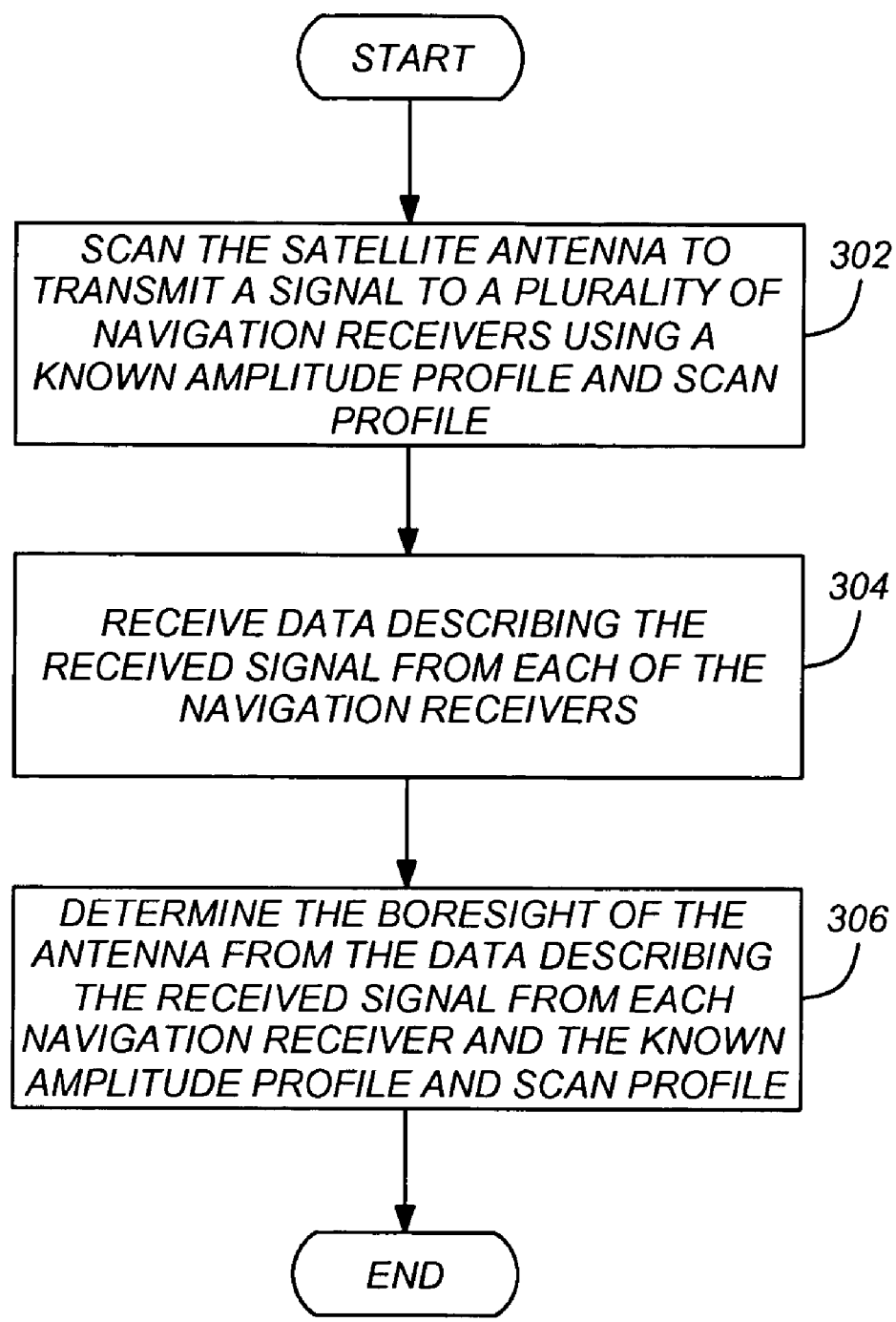
FIGS. 3A and 3B are diagrams describing a technique for calibrating the signal boresight of a satellite antenna.
Figure 3B:
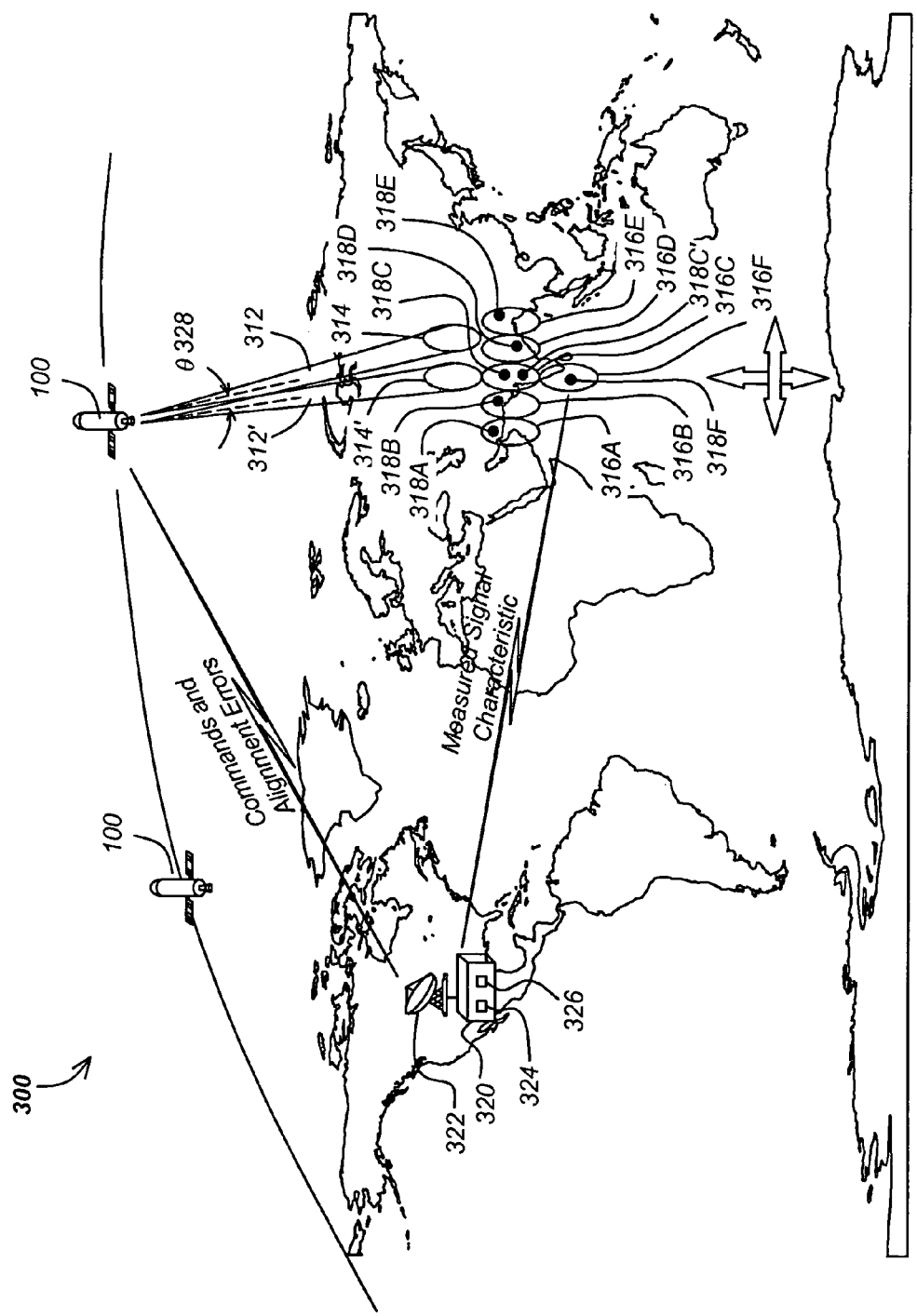

FIGS. 3A and 3B are diagrams describing a technique for calibrating the signal boresight of a satellite antenna 106S. A satellite navigation system 300 comprises a constellation of a plurality of satellites 100, each transmitting navigation signals to one or more navigation receivers 318A-318E. In one embodiment, the satellite navigation system 300 is a global positioning system (GPS), the satellites 100 are GPS satellites and the navigation receivers 318A-318E are GPS receivers. The satellite 100 transmits navigation signals to the navigation receivers 318A-318E (hereinafter collectively referred to as navigation receivers 318) via earth coverage antenna 106E, and, to overcome jamming and other countermeasures, via spot beam antenna 106S, which generates spot beams 316A-316E (hereinafter collectively referred to as spot beams 316). Because of spot beam antenna 106S boresight misalignments, the resulting spot beam 312' may be angularly displaced away from the commanded spot beam 312 by boresight error θ328.

To estimate and compensate for this boresight error θ328, the satellite antenna 106S is scanned to transmit a signal to a plurality of navigation receivers 318 using a known amplitude profile and scan profile, as shown in block 302. This process is illustrated in FIG. 3B. The navigation receivers 318 are preferably global positioning system (GPS) receivers, but they may be any navigation receiver capable of receiving the signal transmitted from the navigation satellite antenna 106S. The command to scan the satellite antenna 106S can originate at a ground station 320 and be transmitted to the satellite 100 via ground station antenna 322 (as illustrated in FIG. 3B), or may originate in the satellite 100. Next, the navigation receivers 318A-318E receive the signal transmitted by the spot beam antenna 106S, and transmit data describing the signal received from the satellite spot beam antenna 106S to the ground station 320. This is shown in block 304. For purposes of simplicity, FIG. 3B illustrates a system wherein the information is transmitted directly to the ground station 320, but the information is typically transmitted to the ground station 320 via other communication entities.

The data describing the signal received from the satellite spot beam antenna 106S can comprise detailed information regarding the received signal (e.g. a temporally varying profile of the amplitude and/or phase of the received signal transmitted from the receiver stations), or may simply comprise the peak value of the received signal, or the peak value of the received signal and the time at which the signal was received. As described below, the location of the navigation receiver 318 that received the satellite signal may be transmitted as well.

Finally, the boresight of the antenna is determined from the data received from the navigation receivers 318 and the known amplitude and scan profile.

The "known" amplitude and scan profile may be known (1) because the satellite antenna 106S always performs the same scan, (2) because the entity computing the boresight of the antenna itself commanded the amplitude and scan profile (and hence knows what the amplitude and scan profile is), or (3) because the amplitude and scan profile was provided to the entity.

The known amplitude "profile" may be constant, temporally varying, or even intermittent. The scan profile may be a simple sweeping row or column scan. In one embodiment, the amplitude and scan profile is a mission profile (one that was commanded for the satellite 100 to perform a particular mission, e.g. direction to particular areas on the globe to support combat operations), and the boresight calibration operations are performed as an adjunct without affecting the mission. In any case, so long as the profile is known, the technique outlined above can be used to determine and compensate for the antenna boresight error.

FIG. 3B illustrates an embodiment wherein the satellite antenna 106S is commanded to transmit the signal by a command module 324 in the ground station 320, and wherein the boresight of the satellite antenna 106S is determined by a boresight calibration module 326, also in the ground station 320. However, the foregoing operations can be performed by different entities than that which is illustrated in FIG. 3B. However, the command module 324 and boresight calibration module 326 may also be implemented in the satellite 100 or elsewhere, and may be implemented in different entities (e.g. the command module 324 in the ground station 320, and the boresight calibration module 326 in the satellite 100). Hence, the computation of the antenna boresight can take place in the satellite 100 itself, using information received directly from transmitters co-deployed with the navigation receivers 318. The known scan and amplitude profile may also be pre-programmed into the satellite and the navigation receivers 318A, in which case, the computation of the antenna boresight may take place without the involvement of the ground station 320. Further, the navigation receivers 318 may be disposed at known locations (e.g. stationary or following a known path), in which case, the location of the navigation receivers 318 need not be communicated to the boresight calibration module 326. Or, the navigation receivers 318 can be moved about at will, and the location of the navigation receivers 318 communicated to the boresight calibration module.

Figure 4:
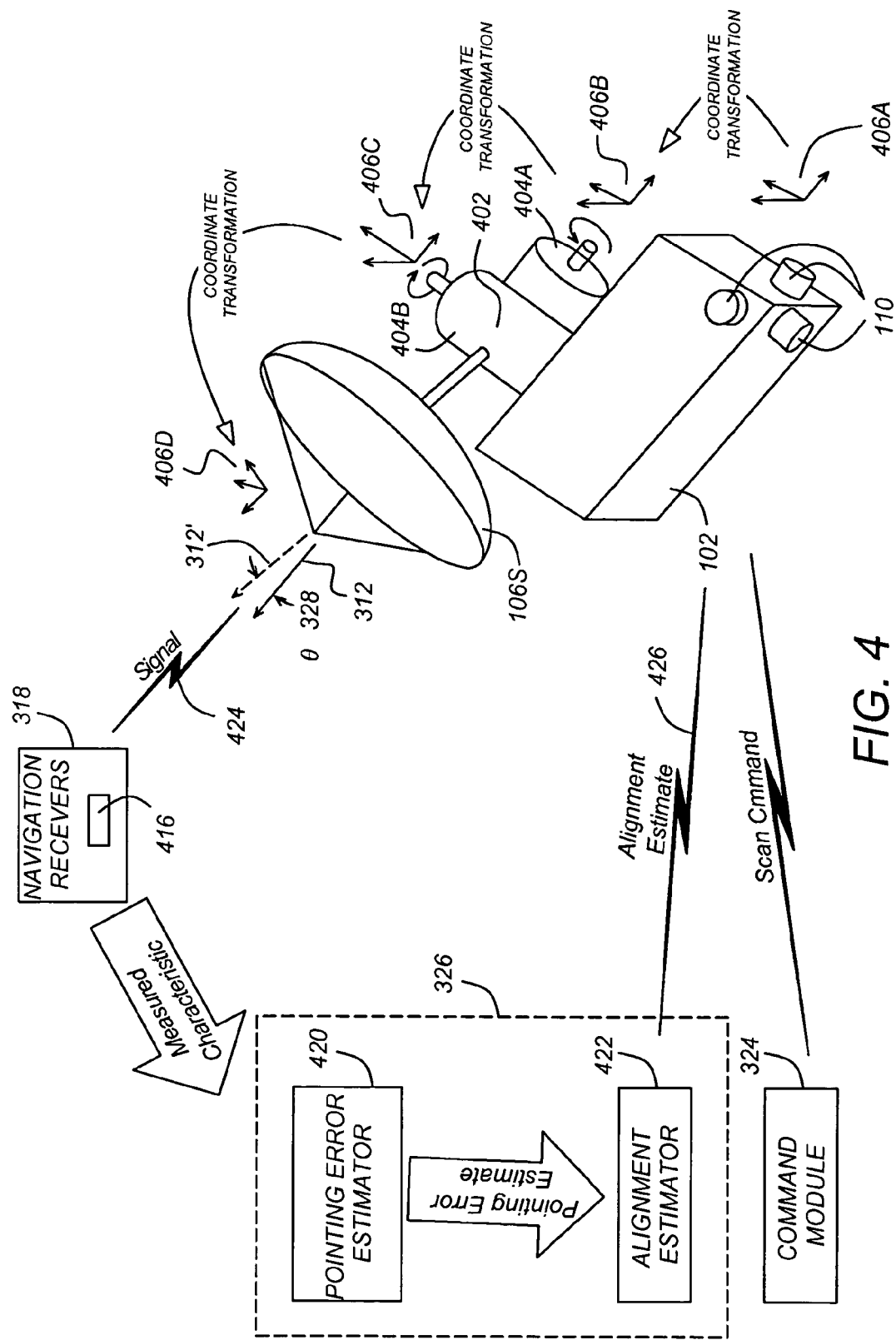
FIG. 4 is a diagram illustrating further details regarding the antenna boresight calibration.

FIG. 4 is a diagram illustrating further details regarding the antenna boresight calibration. The command module 324 transmits a scan command to the satellite 100. The satellite 100 receives the command and scans the satellite spot beam antenna 106S.

Scanning may be electronic (by appropriate phasing of elements in a scanning array) or mechanical (by use of a non-scanning antenna and a gimbal assembly), or a combination of both. FIG. 4 illustrates an embodiment using a gimbal assembly 402 having an inner gimbal 404A and an outer gimbal 404B. The inner gimbal is associated with inner gimbal coordinate frame 406B while the outer gimbal is associated with an outer gimbal coordinate frame 406C. Driven by gimbal motors or other devices (not illustrated), the inner and outer gimbals 404A, 404B angularly direct the antenna 106S boresight (which is represented in antenna signal boresight coordinate frame 406D) where desired to transmit the navigation signal spot beam using the antenna 106S. Both inner and outer gimbals 404 typically include a potentiometer or other means to measure the gimbal angle.

To determine the angle at which the inner and outer gimbals 404 should be positioned to direct the spot beam antenna 106S to the desired scan locations, the spacecraft 100 determines its attitude via the attitude sensors 110, which are mounted on the satellite bus or body 102. Using the measured satellite attitude and the angular and translational displacement between the satellite body 102 and the spot beam antenna (as expressed by coordinate systems 406A-406D), the satellite 100 determines the appropriate gimbal angles, and commands the gimbal motors to move the gimbals to the appropriate positions.

The angular boresight error θ is caused by misalignments between the attitude sensors 110, the gimbals 404 and the antenna 106S. These errors can be expressed in terms of the coordinate systems 406A-406D.

While scanning the antenna 106S, the satellite 100 transmits a signal 424 to the navigation receivers 318. The navigation receivers 318 receive the signal and using a reporting module 416 disposed in each of the navigation receivers 318, report data describing received signal 424. As described above, the data may comprise a number of measured signal characteristics, including the peak value of the received signal 424, when the peak signal was obtained, and/or a temporal profile of the amplitude of the received signal. As described above, the navigation receivers may also report their position.

The data is accepted by the boresight calibration module 326. In the illustrated embodiment, the boresight calibration module 418 includes a pointing error estimator 420 and an alignment error estimator 422. The pointing error estimator 420 generates an estimate of the error Y from the received data, and provides the pointing error estimate to the alignment estimator 422, which generates an estimate of the alignment errors $\hat{X}$ from the pointing error estimate Y and H described below. The alignment estimate is then transmitted to the satellite 100 and used to update the subsystems used to point the spot beam antenna 106S, thus reducing calibrating the signal boresight of the antenna 106S to reduce the boresight error θ.

ESTIMATE OF ALIGNMENT ERROR

The following equation depicts nominal relationship between antenna boresight and spacecraft attitude sensors 110 such as the star trackers 218.

$$V = T_{\alpha 2st} \cdot T_{\beta 2\alpha} \cdot v_{ant}$$

wherein $v_{ant}$ is the antenna boresight vector in the antenna coordinate frame 406D or outer gimbal coordinate 406C;

$T_{\alpha 2st}$ is the coordinate transformation from inner gimbal coordinate frame 406B to spacecraft attitude sensor coordinate frame 406A;

$T_{\beta 2\alpha}$ is the coordinate transformation from outer gimbal coordinate frame 406C to the inner gimbal coordinate frame 406B; and V is the antenna boresight vector in spacecraft attitude sensor coordinate frame 406A.

Alignment errors introduce additional transformation matrices and the above equation becomes $$T_{ant2st}^{true} = \begin{bmatrix} 1 & -\varepsilon_z & \varepsilon_y \\ \varepsilon_z & 1 & -\varepsilon_x \\ -\varepsilon_y & \varepsilon_x & 1 \end{bmatrix} \cdot T_{\alpha 2st}.$$

$$\begin{bmatrix} 1 & -\sigma_z & \sigma_y \\ \sigma_z & 1 & -\sigma_x \\ -\sigma_y & \sigma_x & 1 \end{bmatrix} \cdot T_{\beta 2\alpha} \cdot \begin{bmatrix} 1 & -\delta_z & \delta_y \\ \delta_z & 1 & -\delta_x \\ -\delta_y & \delta_x & 1 \end{bmatrix} \cdot v_{ant}$$

where $\varepsilon_i$ are spacecraft attitude sensor 110 coordinate frame 406A to inner gimbal coordinate frame 406B alignment errors;

$\sigma_i$ are inner gimbal coordinate frame 406B to outer gimbal coordinate frame 406C alignment errors; and $\delta_i$ are outer gimbal coordinate frame 406C to antenna boresight coordinate frame 406D alignment errors.

Only six alignment errors are observable. The three unobservable alignment errors are: $\delta_z$, which is along the antenna boresight and independent from the pointing direction; $\varepsilon_x$ and $\sigma_x$, which are unobservable because they are in nearly the same direction (only the summation is observable); and $\sigma_y$ and $\delta_y$, which, like $\varepsilon_x$ and $\sigma_x$, are also nearly in the same direction, and only the summation is observable).

As a result, the observation model for least-square estimator or Kalman Filter (in the gimbal coordinate frame) modeling can be simplified as $$Y_{KF} = \begin{bmatrix} 1 & -\varepsilon_z & \varepsilon_y \\ \varepsilon_z & 1 & -\varepsilon_x \\ -\varepsilon_y & \varepsilon_x & 1 \end{bmatrix} \cdot T_{\alpha 2st} \cdot$$

$$\begin{bmatrix} 1 & -\sigma_z & \sigma_y \\ \sigma_z & 1 & 0 \\ -\sigma_y & 0 & 1 \end{bmatrix} \cdot T_{\beta 2\alpha} \cdot \begin{bmatrix} 1 & 0 & 0 \\ 0 & 1 & -\delta_x \\ 0 & \delta_x & 1 \end{bmatrix} \cdot v_{ant}$$

Then, the Kalman Filter or least square alignment error state vector is given as $$X = [\varepsilon_x, \varepsilon_y, \varepsilon_z, \sigma_y, \sigma_z, \delta_x]^T$$

Assuming small angle alignment errors, the Kalman Filter/least-square measurement matrix, H, can be derived from the partial derivatives of $$T_{ant2st}^{true}$$

$$H = \begin{bmatrix} \frac{\partial T_{ant2st}^{true}}{\partial \varepsilon} & \frac{\partial T_{ant2st}^{true}}{\partial \sigma} & \frac{\partial T_{ant2st}^{true}}{\partial \delta} \end{bmatrix}$$

A least square estimate of X can be generated by slewing or scanning spot beam antenna and collecting scalar measurements. The estimate will be over-determined when the number of measurements is greater than the state vector dimension. The least square estimate in this case can be written as:

$$\hat{X} = (H^T H)^{-1} H^T Y$$

from which the alignment errors X can be determined.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing is preferably implemented using navigation receivers that can determine their position based on navigation signals (such as GPS receivers), the present invention can be implemented using any signal transmitted via the satellite antenna and using any suitably placed receiver that can receive that signal and report the signal characteristics to the appropriate entity. The location of each of the receivers need not be determined by the receiver or transmitted to the entity computing the calibration, as the location may be known in advance or determined by means other than the signal transmitted by the satellite antenna.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a system for determining the location of a plurality of navigation receivers via reception and processing of navigation signals transmitted from a constellation of navigation satellites, an apparatus for calibrating a signal boresight of a navigation satellite antenna of at least one of the navigation satellites, comprising
   a command module, for commanding the navigation satellite intenna to transmit a signal to one or more of the navigation receivers using a known amplitude profile and scan profile;
   a reporting module, disposed in each of the one or more navigation receivers, for reporting data describing the received signal; and
   a boresight calibration module, for determining the boresight of the navigational satellite antenna from the data describing the received signal from each of the one or more navigation receivers and the known amplitude profile and scan profile.

2. The apparatus of claim 1, wherein the or more navigation receivers are GPS receivers, and the transmitted signal is a GPS signal.

3. The apparatus of claim 1, wherein the boresight calibration module is disposed in a ground station controlling the satellite constellation.

4. The apparatus of claim 1, wherein the boresight calibration module is disposed in one or more of the navigational satellites.

5. The apparatus of claim 1, wherein the one or more navigation receivers further reports its location.

6. The apparatus of claim 1, wherein the signal is a navigation signal.

7. The apparatus of claim 1, wherein the signal can be transmitted intermittently dating the scan.

8. In a system for determining the location of a plurality of navigation receivers via reception and processing of navigation signals transmitted from a constellation of satellites, a method of calibrating a signal boresight of a navigation satellite antenna, of at least one of the navigation satellites comprising the steps of:
   scanning the navigational satellite antenna to transmit a signal to one or more of the navigation receivers using a known amplitude profile and scan profile;
   receiving data describing the received signal from each of the one or more navigation receivers; and
   determining the boresight of the navigational satellite antenna from the data describing the received signal from each of the one or more navigation receivers and the known amplitude profile and scan profile.

9. The method of claim 8, wherein the navigation receivers are GPS receivers, and the transmitted signal is a GPS signal.

10. The method of claim 8, wherein the signal is a navigation signal.

11. The method of claim 8, wherein the signal can be transmitted intermittently during the scan.

12. The method of claim 8, wherein the data is received in a ground control center controlling the navigation satellite.

13. The method of claim 8, wherein the data comprises a peak received signal.

14. The method of claim 8, wherein the data further comprises a time that peak signal was received.

15. In a system for determining the location of a plurality of navigation receivers via reception and processing of navigation signals transmitted from a constellation of satellites, an apparatus for calibrating a signal boresight of a navigation satellite antenna of at least one of the navigation satellites comprising:

means for scanning the navigational satellite antenna to transmit a signal to one or more of the navigation receivers using a known amplitude profile and scan profile;

means for receiving data describing the received signal from each of the one or more navigation receivers; and means for determining the boresight of the navigational satellite antenna from the data describing the received signal from each of the one or more navigation receivers and the known amplitude profile and scan profile.

16. The apparatus of claim 15, wherein the navigation receivers are GPS receivers, and the transmitted signal is a GPS signal.

17. The apparatus of claim 15, wherein the amplitude profile is temporally varying.

18. The apparatus of claim 15, wherein the signal can be transmitted intermittently during the scan.

19. The apparatus of claim 15, wherein the data is received in a ground control center controlling the navigation satellite.

20. The apparatus of claim 15, wherein the data comprises a peak received signal.

* * * * *